Dec. 21, 1965  A. G. SEALEY ETAL  3,224,872
BONDING METHOD OF VALUE IN THE TREATMENT OF METALS
Filed Nov. 9, 1962
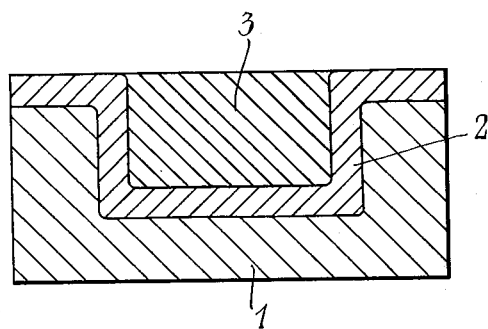
INVENTORS
ALAN GEOFFREY SEALEY
ALFRED TRESHAM ANDREW
by: Wolfe, Hubbard, Voit & Osann
ATTYS.

United States Patent Office 3,224,872
Patented Dec. 21, 1965

3,224,872
BONDING METHOD OF VALUE IN THE TREATMENT OF METALS
Alan G. Sealey and Alfred T. Andrew, Nechells, Birmingham, England, assignors to Foseco International Limited, Nechells, England, a company of Great Britain
Filed Nov. 9, 1962, Ser. No. 236,582
Claims priority, application Great Britain, Nov. 16, 1961, 41,127/61; May 25, 1962, 20,294/62
14 Claims. (Cl. 75—61)

This invention relates to a bonding method of value in the treatment of metals. It has particular value in connection with the treatment of metals in foundry practice and will, therefore, be described with particular reference to that use. Nevertheless, it may be employed, as noted hereinafter, for other purposes.

It is well known practice, in the treatment of molten metals in the foundry, to introduce into the metal a conditioning material in the form of a tablet of such material. Often such tablets are of a character such that under the conditions obtaining in the molten metal they generate a gas which effects the required conditioning of the metal.

It is well known that, in the processing of molten metals, there is a tendency for the metal to occlude and/or dissolve undesirable gases; thus molten copper and its alloys may occlude or dissolve hydrogen. On solidification of such molten metals the occluded or dissolved gas tends to cause small cavities in the solid metal, thus undesirably affecting its physical characteristics. It is, therefore, important to subject molten metal to a so-called degassing treatment and a common method of effecting such treatment is to add to the metal a substance which will generate a gas in the molten metal so that the generated gas in its passage through the metal will entrain the occluded or dissolved gases. One substance of particular use for this purpose is a pre-dried carbonate, e.g. marble, which, at the temperature of the molten metal, decomposes giving rise to a gas which exerts this entraining action.

Gas-generating materials may also be employed to remove unwanted metals from molten metal mixtures. Thus, magnesium may be removed from aluminium by means of chlorine generated by the introduction of hexachlorethane. Similarly aluminium can be removed from copper base alloys such as brass or bronze by means of oxygen gas which is introduced in the form of a tablet of mixed oxidising agents.

In certain cases it is desirable to introduce gas into molten metals, an example being the introduction of gas into metal which is to be used for diecastings for the purpose counteracting contraction and hot tears in such castings. Hydrogen, used for such a purpose, is usually introduced in the form of water vapour by means of tablets of harmless chemical salts containing large amounts of water of crystallisation, e.g. borax.

It is known that the effectiveness of such conditioning materials may be substantially improved by providing that the gas is generated not as a relatively small number of large bubbles but as a large number of small bubbles and that this result can be achieved by the use of compositions which contain, in addition to the gas-generating substance, a particulate carrier material and means for binding the whole together.

To obtain satisfactory treatment of the molten metal, however, it is imperative that the composition, usually in the form of a tablet, should generate its gas while well below the surface of the molten metal. This is a serious difficulty because most such compositions are of relatively low specific gravity and tend to float on the molten metal. Various proposals have been made for artificially increasing the net specific gravity of the tablets, so that they are self-sinking in the molten metal but as the bubbles of gas tend to cling to the tablet in use they may cause the tablet to rise in the molten metal and the method is not always wholly successful. A more positive method, therefore, is to plunge the tablet to the bottom of the molten metal on the end of a plunger rod and this, while effective, usually involves considerable erosion of the plunger rod, which may afterwards need replacement or at least can only be used a limited number of times.

Apart from the gaseous treatments referred to above there are other forms of treatment of molten metal wherein the treatment is effected by introducing a conditioning material into the metal. Thus, alloying agents, e.g. ferro-alloys, deoxidising agents, carburising agents and inoculants may be so incorporated and in these cases too it is important that the added material should be introduced well below the surface of the molten metal in order that it should exert its effect in a satisfactory manner.

Research and experimentation has been carried out in an effort to provide means of overcoming these difficulties by providing means whereby a block of conditioning material could be held in position, e.g. at the side or at the bottom of a ladle or ingot or casting mould, without reliance solely on gravity and without the use of a plunger rod. In the result a method has been found which is not only effective for the purposes indicated above but it is of general value where it is required to locate a block of a treating material in a particular position relative to a metal being treated.

According to the present invention, a method of bonding a block of conditioning agent for molten metal to a metal or refractory surface comprises providing between said block and said surface a composition which contains ingredients which react together exothermically on firing and which, when fired, generate a high melting fluid slag, causing said layer to fire, thereby generating said fluid slag and allowing the slag to cool sufficiently to bond the said block to the said surface.

The term "conditioning agent" used herein is intended to include any agent which it is desired to add to molten metal to modify its chemical composition or physical characteristics and includes degassing agents, desulphurising agents, grain refining additives, alloying additives, carburising compounds inoculants for cast iron, phosphorus containing additives for copper alloys and additives for removing any undesired ingredients or impurities from molten metal.

The exothermic composition may be provided as a layer of loose powder or granules or of pasty consistency or may be a preformed layer adapted to be introduced between the block and the surface to which it is to be bonded. Specific means of application are, for example:

(a) The exothermic composition may be mixed with a proportion of a binder and dampened to form a paste which may be trowelled on to the surface to which the block is to be applied, or on to the base of the block. When being used in a hot ladle or crucible, the residual heat is sufficient to dry out the damp composition.

(b) Similarly, an exothermic paste may be squeezed from a tube on to the base of the block or on to the surface to which it is to be affixed.

(c) A small heap of powder or a preformed disc of the exothermic composition may be placed in a ladle or crucible and ignited.

The conditioning tablet or block may be placed on the exothermic composition before, during or after ignition of the composition, providing that the composition has not chilled or gone solid.

In one particularly useful form of the invention the said composition may be applied to the block as a preliminary operation, the block then being placed in the desired position on the surface with the said composition in contact with the surface.

Thus according to a further feature of the present invention there is provided a tablet comprising a conditioning agent for molten metal and a filler or carrier therefor, the said tablet having attached thereto, or embedded therein, but covering part of the surface of the tablet, a composition which contains ingredients which react together exothermically on firing and which when fired, generate a high melting fluid slag.

The said exothermic composition may be applied to one surface of the tablet, wholly or partly covering that surface, or may be recessed in one face of the tablet. In one preferred form the tablet is provided with a central aperture which is wholly or partially filled with a said exothermic composition.

According to a further aspect of the present invention, in a method for conditioning molten metal, a tablet as aforesaid is placed on the side or bottom of a vessel into which the molten metal is intended to be poured, e.g. a casting mould or an ingot mould, is fired when thus in position and, before the vessel is filled with molten metal, is allowed to cool so that the slag solidifies, and the molten metal is then poured into the vessel.

Generally, the vessel will be pre-heated before introducing molten metal to ensure that any refractory lining is dry, thus avoiding the risk of blowing. The residual heat from the pre-drying operation is usually sufficient to ignite the exothermic material. When the residual heat is not sufficient, ignition can be effected by means of a fuse, primer or blow-torch.

It is found that the fluid slag formed by the exothermic reaction is rapidly chilled by the vessel with which it contacts so that the tablet as a whole is securely affixed in position to the bottom of the vessel. Hence, when the molten metal is poured into the vessel the conditioning effect, e.g. the generation of gas from the conditioning tablet, occurs from below the body of molten metal and a very thorough treatment is effected.

The exothermic composition may be of the type known under the registered trademark "Thermit" being a composition consisting essentially of iron oxide and aluminium. More generally, it may contain any readily oxidisable metal such as aluminium, silicon or magnesium, together with any oxidising agent, any of those conventionally used in exothermic compositions in foundry practice, e.g. iron oxide, manganese dioxide, or alkali metal or alkaline earth metal, nitrates or chlorates, or mixtures of any of these. It should preferably contain a siliceous material as this provides a ready means whereby a fluid slag is produced, e.g. calcium silicide, ferro-silicon or silicon (e.g. as sand).

It may contain a small amount, e.g. 0.1 to 15% of a fluoride, which serves to steady the exothermic reaction, examples being the alkali metal and alkaline earth metal fluorides and complex fluorides, e.g. sodium or potassium fluorides, sodium or potassium cryolites, aluminium fluoride, titanofluorides, silicofluorides and borofluorides.

The actual formulation of the exothermic composition will conveniently be varied to suit the proposed conditions of use. Thus, it should be formulated so that the temperature generated is sufficient to form a liquid slag which is solid at the temperature of the vessel with which the tablet is to be used and remains solid or only slowly becomes pasty at the temperature of the molten metal which is poured. On the other hand, regard must be had to the nature of the conditioning agent that it is not destroyed by the heat generated by the exothermic composition. If there is any serious danger of a deleterious effect on the conditioning agent, there may be provided a layer of heat insulating material, e.g. compacted grog or the like, between the exothermic composition and the tablet, such layer being pre-fixed to the tablet. This is the more necessary when the tablet contains a volatile conditioning agent such as hexachlorethane.

The following specific example will serve to illustrate the invention:

*Example*

A 4 ounce block is formed of the following composition (by weight):

| | Percent |
|---|---|
| Coarse marble chippings | 60 |
| Fine marble powder | 28 |
| Sodium silicate | 12 | and thoroughly dried before use. The block is formed with a central aperture and into this is placed ½ ounce of an exothermic material of the following composition (by weight):

| | Percent |
|---|---|
| Calcium silicide | 46 |
| Iron oxide (Millscale) | 23 |
| Manganese dioxide (as ore) | 23 |
| Potassium chlorate | 8 |

The aperture in the block is sealed off at one side with adhesive cellulose tape and on the other by a thin sheet of cardboard. It is placed in the bottom of a refractory lined steel vessel which has been preheated to about 600° C., to thoroughly dry the refractory lining, and the residual heat in the lining causes the composition to fire. It heats exothermically to about 1,600° C. to 2,000° C. and forms a fluid glassy slag, the cellulose tape and the cardboard layer being burnt away. The slag has a very high melting point and is rapidly chilled by the heated, but relatively much cooler, vessel and is thus chilled and set. It constitutes a strong adhesive bond between the tablet and the vessel.

Molten copper alloy is then poured into the vessel. Whilst a little of the carbonate is decomposed by the heat generated by the burning exotheric material the bulk of it remains and is thus effective in degassing the molten metal, the gas generated from the tablet passing upwards through the molten metal while the tablet remains firmly fixed in position.

When the treatment is completed the vessel is emptied. When cold, the residue of the tablet may readily be broken away from the base of the vessel.

It may be noted that by providing that the exothermic material is located in an aperture passing through the tablet, a passage is afforded through the tablet for the escape of gases generated by the exothermic reaction and thus the tablet accordingly stays in position while the exothermic reaction is proceeding as there is no tendency for the gases generated to escape beneath the tablet with the possibility of dislodging the tablet.

It is a particular advantage of the invention that it enables a bond to be provided which does not contain any hydrogen among its constituent elements, a factor of considerable importance where the tablet used is intended to remove hydrogen from molten metal. Moreover, the heat generated by the burning of the exothermic composition, if the burning is effected in the presence of the treating agent, serves also to dry out the treating agent thus further reducing any tendency for the treating agent fortuitously to introduce a source of hydrogen into the metal.

It will be understood that by means of this invention different types of conditioning agent may be affixed to the treatment vessel so that different treatments are effected simultaneously or in sequence.

Whilst the bonding method herein described is of especial value in the location of blocks of treating agent in a position where they may effect the treatment of molten metal, the method is of value in any other connection where a block of treating agent is to be secured in position on a metal or refractory surface. Thus, treating agents may be applied to the weld areas of welded pipes by this method. It is also possible by the method to secure a block of treating agent to the end of a plunger rod (having a metal or refractory surface) so that the block will stay affixed to the plunger rod when it is plunged into molten metal.

A form of tablet according to the present invention is illustrated in section in the accompanying drawing. It consists of a block of conditioning agent and filler 1, a heat insulating layer 2 and a layer 3 of a composition of which the ingredients react exothermically when fired to yield a fluid high-melting slag.

We claim as our invention:

1. A tablet comprising a conditioning agent for molten metal and a filler, the said tablet having secured thereto and covering part of its surface a layer of a composition which contains ingredients which react together exothermically on firing to generate a high melting fluid slag.

2. A tablet comprising a conditioning agent for molten metal and a filler, the said tablet having secured thereto and covering part of its surface a layer of a composition which contains calcium silicide and oxidising agent.

3. A tablet comprising a conditioning agent for molten metal and a filler, the said tablet having secured thereto and covering part of its surface a layer of a composition which contains aluminothermic ingredients and a siliceous filler.

4. A tablet comprising a degassing agent for molten metal and a filler, the said tablet having secured thereto and covering part of its surface a layer of a composition which contains ingredients which react together exothermically on firing to generate a high melting fluid slag.

5. A tablet comprising a degassing agent for molten metal and a filler, the said tablet having secured thereto and covering part of its surface a layer of a composition which contains calcium silicide and oxidising agent.

6. A tablet comprising a degassing agent for molten metal and a filler, the said tablet having secured thereto and covering part of its surface a layer of a composition which contains aluminothermic ingredients and a siliceous filler.

7. A tablet comprising a conditioning agent for molten metal and a filler, a layer of a composition which contains ingredients which react together exothermically when fired to yield a high melting fluid slag and, between said composition and said conditioning agent a layer of a heat-insulating material.

8. A method of conditioning molten metal which comprises bonding to the inside surface of a vessel for containing molten metal a block of conditioning agent for molten metal by providing between said block and said surface a composition which contains ingredients which react together exothermically when fired to generate a fluid high-melting slag, firing said composition to generate such slag and allowing the slag to cool sufficiently to bond the said block to the said surface, and thereafter charging the said vessel with the said molten metal to a level such that the block is below the surface of the molten metal.

9. A method of conditioning molten metal which comprises bonding to the inside surface of a vessel for containing molten metal a block of conditioning agent for molten metal by providing between said block and said surface a composition which contains ingredients which react together exothermically when fired to generate a fluid high-melting slag, firing said composition to generate such slag and allowing the slag to cool sufficiently to bond the said block to the said surface, the said composition being provided in finely divided form, and thereafter charging the said vessel with the said molten metal to a level such that the block is below the surface of the molten metal.

10. A method of conditioning molten metal which comprises bonding to the inside surface of a vessel for containing molten metal a block of conditioning agent for molten metal by providing between said block and said surface a composition which contains ingredients which react together exothermically when fired to generate a fluid high-melting slag, firing said composition to generate such slag and allowing the slag to cool sufficiently to bond the said block to the said surface, the said composition being provided as a pre-formed solid layer on the block of conditioning agent, and thereafter charging the said vessel with the said molten metal to a level such that the block is below the surface of the molten metal.

11. A method of conditioning molten metal which comprises bonding to the inside surface of a vessel for containing molten metal a block of conditioning agent for molten metal by providing between said block and said surface a composition which contains ingredients which react together exothermically when fired to generate a fluid high-melting slag, firing said composition to generate such slag and allowing the slag to cool sufficiently to bond the said block to the said surface, the said composition being provided as a pre-formed solid layer applied to the site where the bond is to be effected, and thereafter charging the said vessel with the said molten metal to a level such that the block is below the surface of the molten metal.

12. A method of conditioning molten metal which comprises bonding to the inside surface of a vessel for containing molten metal a block of conditioning agent for molten metal by providing between said block and said surface a composition comprising calcium silicide and oxidising agent which when fired generates a fluid high-melting slag, firing said composition to generate such slag and allowing the slag to cool sufficiently to bond the said block to the said surface, and thereafter charging the said vessel with the said molten metal to a level such that the block is below the surface of the molten metal.

13. A method of conditioning molten metal which comprises bonding to the inside surface of a vessel for containing molten metal a block of conditioning agent for molten metal by providing between said block and said surface a composition comprising aluminothermic ingredients and a silicious filler which when fired generates a fluid high-melting slag, firing said compositiion to generate such slag and allowing the slag to cool sufficiently to bond the said block to the said surface, and thereafter charging the said vessel with the said molten metal to a level such that the block is below the surface of the molten metal.

14. A method of conditioning molten metal which comprises bonding to the inside surface of a vessel for containing molten metal a block of conditioning agent for molten metal by providing between said block and said surface a composition which contains ingredients which react together exothermically when fired to generate a fluid high-melting slag, firing said composition to generate such slag and allowing the slag to cool sufficiently to bond the said block to the said surface, a layer of heat insulating material prefixed to said block being provided between the said surface and the said block, and thereafter charging the said vessel with the said molten metal to a level such that the block is below the surface of the molten metal.

References Cited by the Examiner

UNITED STATES PATENTS

| 2,426,849 | 9/1947 | Udy | 75—27 |
| 2,519,593 | 8/1950 | Offenhauer | 75—61 |
| 2,854,328 | 9/1958 | Rossborough | 75—53 |

FOREIGN PATENTS

| 544,888 | 5/1942 | Great Britain. |
| 827,619 | 2/1960 | Great Britain. |

BENJAMIN HENKIN, *Primary Examiner.*